United States Patent Office 3,729,500
Patented Apr. 24, 1973

3,729,500
1-CYANO-2-SUBSTITUTED ETHENE-SULFONAMIDES
Edward J. Cragoe, Jr., Lansdale, Pa., assignor to Merck & Co., Inc., Rahway, N.J.
No Drawing. Filed Sept. 3, 1970, Ser. No. 69,452
Int. Cl. C07c 21/66
U.S. Cl. 260—465 D                    7 Claims

ABSTRACT OF THE DISCLOSURE

Novel 1-cyano-2-substituted ethenesulfonamides which are useful as diuretic and saluretics and which are prepared by treating an appropriate aldehyde with 1-cyanomethanesulfonamide in the presence of a catalyst. Alternatively, these novel products may also be obtained by treating an appropriate aldehyde with a primary amine followed by the treatment of the intermediate thus obtained with 1-cyanomethanesulfonamide.

---

This invention relates to a novel class of 1-cyano 2-substituted-ethenesulfonamides. It is also an object of this invention to describe various methods for the preparation of the novel 1-cyano-2-substituted-ethenesulfonamides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body tissue, lower dangerous excesses of fluid levels to acceptable limits and, in general, alleviate conditions usually associated with edema.

The 1-cyano-2-substituted-ethenesulfonamides (I, infra) of this invention have the following structural formula:

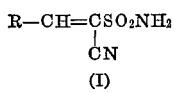

(I)

wherein R is aryl, for example, a mononuclear aryl such as phenyl and the like or a polynuclear aryl such as naphthyl and the like which may be unsubstituted or substituted with from one to five substituents which are the same or different radicals selected from halogen such as chloro, bromo, fluoro and the like, hydroxy, alkoxy, for example, lower alkoxy such as methoxy, ethoxy and the like, carboxy lower alkoxy such as carboxymethoxy and the like, lower alkylenedioxy such as methylenedioxy and the like, alkyl, for example, lower alkyl such as methyl and the like, alkanoylamino, for example, lower alkanoylamino such as acetylamino and the like or trihalo lower alkyl, for example, trihalomethyl such as trifluoromethyl and the like; R may also be a heterocycle, for example, a 5- or 6-membered heterocycle containing a single oxygen, sulfur or nitrogen atom such as 2-furyl, 2-pyrrolyl, 2-thienyl, 2, 3 or 4-pyridyl and the like; and the non-toxic, pharmaceutically acceptable salts thereof, for example, salts derived from the alkali metals and alkaline earth metals, for example, the alkali metal and alkaline earth metal carbonates, hydroxides and lower alkoxides such as sodium carbonate, sodium hydroxide, magnesium carbonate, calcium hydroxide, potassium hydroxide, sodium methoxide and the like or from organic bases, for example, amines such as monoalkylamines, dialkylamines, tertiary amines or heterocyclic amines such as methylamine, dimethylamine, diethylamine, triethylamine, piperidine, pyrrolidine, morpholine and the like.

A preferred embodiment of this invention relates to compounds having the following structural formula:

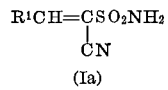

(Ia)

wherein $R^1$ is a 2-furyl, 3-pyridyl or a phenyl radical substituted with from 1 to 3 substituents selected from halo such as chloro and the like, hydroxy, lower alkoxy such as methoxy and the like or lower alkanoylamino such as acetylamino and the like. The following are representative of the preferred phenyl radicals: 2,3-dichloro-4-methoxyphenyl; 3 - chloro - 4 - methoxyphenyl; 4-hydroxyphenyl; 3-methoxy-4-hydroxyphenyl; 4-acetylaminophenyl and the like and the non-toxic, pharmaceutically acceptable salts thereof such as the alkali metal and alkaline earth metals salts such as the sodium salt or potassium salt. The foregoing class of compounds exhibits particularly good diuretic and saluretic actvity and represents a preferred subgroup of compounds within the scope of this invention.

The 1-cyano-2-substituted-ethenesulfonamide (I) may be prepared by either of two alternative methods. One method comprises treating an appropriate aldehyde (II) with 1-cyanomethanesulfonamide in the presence of a catalyst. A second method comprises treating an appropriate aldehyde (II) with a primary amine followed by treating the intermediate formed with 1-cyanomethanesulfonamide.

The first of the above-identified methods for preparing the 1-cyano-2-substituted ethenesulfonamides comprises treating an appropriate aldehyde (II, infra) with 1-cyanomethenesulfonamide in the presence of a catalyst, preferably ammonium acetate; however, other catalysts may also be employed, for example, amine acetates such as piperidinium acetate and the like. To insure completion of the reaction, the water formed during the course of the reaction may be removed by various means, for example, by conducting the reaction in the presence of molecular sieves. However, even though the reaction may be conducted in the absence of a solvent, it has been found convenient to conduct the reaction in a water immiscible solvent which forms an azeotrope with water, for example, benzene, toluene, xylene, chloroform, carbon tetrachloride and the like. The temperature at which the reaction is conducted is not a critical aspect of this invention; however, the reaction is conveniently conducted at the reflux temperature of the particular solvent employed. The following equation illustrates this reaction:

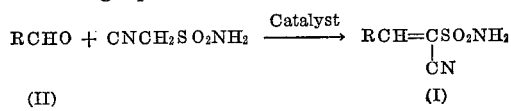

wherein R is as defined above.

The second of the above-identified methods for preparing the 1-cyano-2-substituted-ethenesulfonamides (I) comprises treating an appropriate aldehyde (II, supra) with a primary amine, for example, with an alkylamine such as a lower alkylamine as illustrated by n-butylamine, pentylamine, hexylamine and the like or a cycloalkylamine, for example, a lower cycloalkylamine such as cyclopentylamine, cyclohexylamine and the like to afford a Schiff base intermediate (III, infra), which intermediate is then treated with 1-cyanomethanesulfonamide to afford the desired 1-cyano-2-substituted-ethenesulfonamide (I). The initial step of treating the aldehyde reactant (II) with the primary amine may be conducted without a solvent; however, any solvent which is inert or substantially inert to the reactants may also be employed and, to insure completion of the reaction, water immiscible solvents are generally employed. Suitable water immiscible solvents include, for example, benzene, toluene, xylene and the like. The final step, which consists of treating the Schiff base intermediate with 1-cyanomethanesulfonamide, may be conducted in the presence or absence of a solvent but, in general, it is most advantageous to employ a lower alkanoic acid such as acetic acid, propionic acid and the like. Either or both of the reaction steps may be conducted at a temperature in the range of from about 20° C. to about 120° C.; however, in practice, the reaction is conveniently conducted at the reflux temperature of the particular solvent employed. The following equation illustrates this reaction:

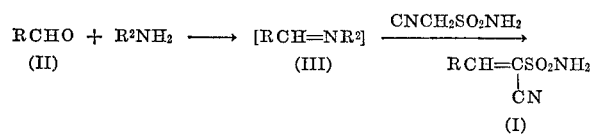

wherein R is as defined above and $R_2$ is alkyl, for example, lower alkyl such as butyl, pentyl, hexyl and the like or cycloalkyl, for example, lower cycloalkyl such as cyclopentyl, cyclohexyl and the like.

The aldehyde (II, supra) employed are either known compounds or may be prepared by methods well known to those skilled in the art. For example, the alkoxy substituted benzaldehydes (IIa, infra) are prepared by treating the corresponding hydroxybenzaldehyde (IV, infra) with a dialkyl sulfate, for example, a lower dialkyl sulfate such as dimethyl sulfate and the like in the presence of a base, for example, an alkali metal base such as sodium hydroxide and the like. The solvent employed is generally an alkanol of which the alkyl portion corresponds to the alkyl portion of the alkyl sulfate, for example, methanol, ethanol and the like. The reaction is conveniently conducted at the reflux temperature of the particular solvent employed. The following equation illustrates this process:

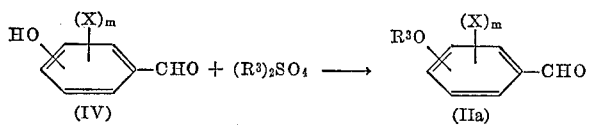

wherein X is hydrogen, halo such as bromo, chloro, fluoro and the like, alkyl, for example, lower alkyl such as methyl and the like or trihalo lower alkyl, for example, trihalomethyl such as trifluoromethyl and the like; $R^3$ is alkyl, for example, lower alkyl such as methyl, ethyl and the like and $m$ is an integer having a value of 1 to 4.

The examples which follow illustrate the 1-cyano-2-substituted-ethenesulfonamides of this invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

1-cyano-2-(2,3-dichloro-4-methoxyphenyl) ethenesulfonamide

Step A.—2,3-dichloro-4-methoxybenzaldehyde: A refluxing mixture of 2,3-dichloro-4-hydroxybenzaldehyde (58.59 g., 0.3067 mole), methanol (500 ml.) and 10 N sodium hydroxide solution (30.67 ml., 0.3067 mole) is treated simultaneously with dimethyl sulfate (135.34 g., 1.073 mole) and 10 N sodium hydroxide (76.64 ml., 0.7663 mole). The addition period requires 2½ hours and refluxing is continued for one hour longer. The reaction mixture is cooled and the resulting solid is collected by filtration. The solid is dissolved in chloroform; the organic solution is washed well with water and then dried over anhydrous magnesium sulfate. The solvent is evaporated in vacuo to yield 49.6 g. (79%) of crude product as a yellow solid, M.P. 114°–115° C. Recrystallization from cyclohexane yields 2,3-dichloro-4-methoxybenzaldehyde as light yellow needles, M.P. 116°–117° C.

*Elemental analysis.*—Calcd. for $C_8H_6Cl_2O_2$ (percent): C, 46.86; H, 2.95; Cl, 34.58. Found (percent): C, 47.08; H, 2.97; Cl, 34.28.

By substituting an equivalent quantity of diethyl sulfate for the dimethyl sulfate and conducting the reaction in a similar manner, there is obtained 2,4-dichloro-4-ethoxybenzaldehyde.

Step B.—1 - cyano - 2 - (2,3 - dichloro - 4 - methoxyphenyl)ethenesulfonamide: A mixture of 2,3-dichloro-4-methoxybenzaldehyde (4.10 g., 0.02 mole), 1-cyanomethanesulfonamide (2.88 g., 0.024 mole), toluene (20 ml.), acetic acid (5 ml.) and ammonium acetate (60 mg.) is heated under reflux, under a constant water separator, until the evolution of water ceases. The time required is two hours. The reaction mixture is cooled and the resulting solid is collected and dried. The yield of crude product is 6.14 g. (100%). Recrystallization from acetic acid yields 1 - cyano - 2 - (2,3-dichloro-4-methoxyphenyl)ethenesulfonamide as white needles, M.P. 183°–185° C.

*Elemental analysis.*—Calcd. for $C_{10}H_8Cl_2N_2O_3S$ (percent): C, 39.10; H, 2.63; N, 9.12. Found (percent): C, 38.76; H, 2.60; N, 9.06.

EXAMPLE 2

1-cyano-2-(2,4-dichlorophenyl)ethenesulfonamide

A mixture of 2,4-dichlorobenzaldehyde (3.50 g., 0.02 mole), 1-cyanomethanesulfonamide (2.88 g., 0.024 mole), toluene (20 ml.), acetic acid (5 ml.) and ammonium acetate (60 mg.) is heated under reflux, under a constant water separator, until the evolution of water ceases. The time required is two hours. The reaction mixture is cooled and the resulting solid is collected and dried. The yield of crude product is 5.25 g. (95%). Recrystallization from acetic acid yields 1-cyano-2-(2,4-dichlorophenyl)ethenesulfonamide as white rods, M.P. 176°–179° C.

*Elemental analysis.*—Calcd. for $C_9H_6Cl_2N_2O_2S$ (percent): C, 39.00; H, 2.18; N, 10.11. Found (percent): C, 39.20; H, 2.32; N, 10.10.

EXAMPLE 3

1-cyano-2-(3-methoxy-4-hydroxyphenyl) ethenesulfonamide

A mixture of vanillin (3.04 g., 0.02 mole), 1-cyanomethanesulfonamide (2.66 g., 0.0222 mole), toluene (20 ml.), acetic acid (5 ml.) and ammonium acetate (60 mg.) is heated under reflux, under a constant water separator, until the evolution of water ceases. The time required is 20 minutes. The reaction mixture is cooled and the resulting solid is collected and dried. The yield of crude product is 5.08 g. (100%). Recrystallization from nitromethane yields 1-cyano-2-(3-methoxy-4-hydroxyphenyl)ethenesulfonamide as yellow needles, M.P. 172.5°–173.5° C.

*Elemental analysis.*—Calcd. for $C_{10}H_{10}N_2O_4S$ (percent): C, 47.24; H, 3.96; N, 11.02. Found (percent): C, 47.48; H, 4.08; N, 11.00.

EXAMPLE 4

1-cyano-2-(3,4-methylenedioxyphenyl) ethenesulfonamide

A mixture of piperonal (3.00 g., 0.022 mole), toluene (20 ml.), acetic acid (5 ml.) and ammonium acetate (60 mg.) is heated under reflux, under a constant water separator, until the evolution of water ceases. The time required is 15 minutes. The reaction mixture is cooled and the resulting solid is collected and dried. The yield of crude product is 5.04 g. (100%). Recrystallization from nitromethane yields 1 - cyano-2 - (3,4-methylenedioxyphenyl)ethenesulfonamide as yellow prisms, M.P. 196°–198° C.

*Elemental analysis.*—Calcd. for $C_{10}H_2N_2O_4S$ (percent): C, 47.61; H, 3.20; N, 11.11. Found (percent): C, 47.88; H, 3.33; N, 11.08.

EXAMPLE 5

1-cyano-2-(1-naphthyl)ethenesulfonamide

A mixture of 1-naphthaldehyde (3.12 g., 0.02 mole), 1-cyanomethanesulfonamide (2.64 g., 0.022 mole), toluene (20 ml.), acetic acid (5 ml.) and ammonium acetate (60 mg.) is heated under reflux, under a constant water separator, until the evolution of water ceases. The time required is two hours. The reaction mixture is cooled and the resulting solid is collected and dried. The yield of crude product is 5.17 g. (100%). Recrystallization from acetic acid yields 1-cyano-2-(1-naphthyl)ethenesulfonamide as yellow prisms, M.P. 174°–176° C.

*Elemental analysis.*—Calcd. for $C_{13}H_{10}N_2O_2S$ (percent): C, 60.45; H, 3.90; N, 10.85. Found (percent): C, 60.80; H, 3.94; N, 10.83.

EXAMPLE 6

1-cyano-2-(3-pyridyl)ethenesulfonamide

Pyridine-3-carboxaldehyde (2.14 g., 0.002 mole) is dissolved in benzene (25 ml.) and n-butylamine (2 ml., 0.020 mole) is added. The mixture is refluxed under a water separator for ½ hour. The benzene is evaporated and to the residue, which consists of 3-(n-butylformimidoyl)pyridine, is added 1-cyanomethanesulfonamide (2.5 g., 0.0208 mole) in acetic acid (20 ml.). The mixture is heated to boiling and then diluted with hot water (40 ml.). The solid that separates is purified by crystallization from nitromethane to yield 1.25 g. (30% yield) of 1-cyano - 2 - (3-pyridyl)ethenesulfonamide, M.P. 198°–199° C.

*Elemental analysis.*—Calcd. for $C_8H_7N_3O_2S$ (percent): C, 45.93; H, 3.37; N, 20.08. Found (percent): C, 46.04; H, 3.55; N, 20.27.

By following the procedure described in Example 1, Step B, or the procedure described in Example 6, all of the products of this invention may be prepared. Thus, by substituting an appropriately substituted aldehyde for the 2,3-dichloro-4-methoxybenzaldehyde of Example 1, Step B, or for the pyridine-3-aldehyde of Example 6, and by following substantially the procedure described therein, the correspondingly substituted 1 - cyano-2-substituted ethenesulfonamide (I) of this invention may be prepared. The following equation illustrates the reaction of Example 1, Step B, and, together with Tables I and II illustrates the 1-cyano-2-substituted ethenesulfonamide obtained:

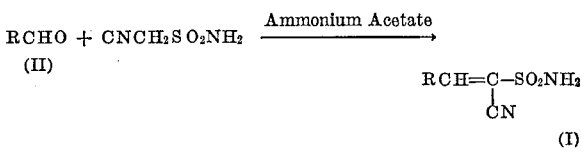

$$RCHO + CNCH_2SO_2NH_2 \xrightarrow{\text{Ammonium Acetate}}$$
(II)

$$RCH=C-SO_2NH_2$$
$$\phantom{RCH=}|$$
$$\phantom{RCH=}CN$$
(I)

TABLE I

| Example No. | R | Melting point of Product I, °C | Formula | Calculated C | Calculated H | Calculated N | Found C | Found H | Found N | Percent yield of Product I |
|---|---|---|---|---|---|---|---|---|---|---|
| 7 | 2-thienyl | 201–202 | $C_7H_6N_2O_2S_2$ | 39.24 | 2.82 | 13.07 | 39.53 | 3.02 | 13.12 | 65 |
| 8 | 2-furyl | 175–179 | $C_7H_6N_2O_3S$ | 42.42 | 3.05 | 14.13 | 42.63 | 3.02 | 14.12 | 40 |
| 9 | 1H-pyrrol-2-yl | 188–189 | $C_7H_7N_3O_2S$ | 42.63 | 3.58 | 21.31 | 43.24 | 3.72 | 21.38 | 53 |
| 10 | 2,3-dichloro-4-hydroxyphenyl | 201–202 | $C_9H_6Cl_2N_2O_3S$ | 36.88 | 2.06 | 9.56 | 36.99 | 2.13 | 9.59 | 39 |
| 11 | 4-methoxyphenyl | 131–132 | $C_{10}H_{10}N_2O_3S$ | 50.41 | 4.23 | 11.76 | 50.51 | 4.20 | 11.59 | 40 |
| 12 | phenyl | 176–178 | $C_9H_8N_2O_2S$ | 51.91 | 3.87 | 13.45 | 52.08 | 4.03 | 13.14 | 53 |
| 13 | 3,4-dichlorophenyl | 187–189 | $C_9H_6Cl_2N_2O_2S$ | 39.01 | 2.18 | 10.11 | 38.62 | 2.31 | 10.10 | 15 |
| 14 | 3,4,5-trimethoxyphenyl | 210–212 | $C_{12}H_{14}N_2O_5S$ | 48.32 | 4.73 | 9.39 | 48.43 | 4.82 | 9.36 | 73 |
| 15 | 4-hydroxyphenyl | 227–228 | $C_9H_8N_2O_3S$ | 48.21 | 3.60 | 12.49 | 48.52 | 3.83 | 12.50 | 76 |
| 16 | 2,5-dichloro-3-methoxyphenyl | 192–193 | $C_{10}H_8Cl_2N_2O_3S$ | 39.10 | 2.62 | 9.12 | 39.15 | 2.36 | 8.90 | 32 |
| 17 | 4-acetamidophenyl | 231–232 | $C_{11}H_{11}N_3O_3S$ | 49.80 | 4.18 | 15.84 | 50.26 | 4.29 | 15.71 | 79 |

TABLE I—Continued

| Example No. | R | Melting point of Product I, °C | Formula | Analysis of Product I Calculated C | H | N | Found C | H | N | Percent yield of Product I |
|---|---|---|---|---|---|---|---|---|---|---|
| 18 | CH₃O—⟨Cl⟩— | 189–191 | C₁₀H₉ClN₂O₃S | 44.04 | 3.33 | 10.27 | 44.38 | 3.39 | 10.08 | 90 |
| 19 | (CH₃)₂CH—⟨⟩— | 148–149 | C₁₂H₁₄N₂O₂S | 57.58 | 5.64 | 11.11 | 57.44 | 5.45 | 11.17 | 56 |
| 20 | ⟨Cl,Cl⟩— | 180–182 | C₉H₆Cl₂N₂O₂S | 39.01 | 2.18 | 10.11 | 38.70 | 2.26 | 9.89 | 56 |
| 21 | HO—C(O)—CH₂O—⟨Cl,Cl⟩— | 232–235 | C₁₁H₈Cl₂N₂O₅S | 37.62 | 2.30 | 7.98 | 37.90 | 2.54 | 7.85 | 62 |

$$RCHO + CNCH_2SO_2NH_2 \xrightarrow{\text{Ammonium Acetate}} \underset{\underset{CN}{|}}{RCH=C}-SO_2NH_2$$

TABLE II

| Example No. | R |
|---|---|
| 22 | 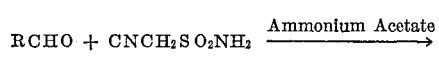 (2,3,5,6-tetramethyl-4-hydroxyphenyl) |
| 23 | 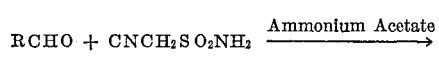 |
| 24 | ⟨F⟩— |
| 25 | C₂H₅O—⟨Cl,Cl⟩— |
| 26 | ⟨CF₃⟩— |
| 27 | ⟨Br⟩— |

The following equation illustrates the reaction of Example 6 and, together with Table III, illustrates the 1-cyano-2-substituted-ethenesulfonamides obtained thereby:

$$RCHO + R^2NH_2 \longrightarrow [RCH=NR^2]$$
$$\text{III}$$
$$\downarrow CNCH_2SO_2NH_2$$
$$\underset{\underset{CN}{|}}{RCH=C}SO_2NH_2$$
$$\text{I}$$

wherein $R^2$ is alkyl, for example, lower alkyl such as butyl, pentyl, hexyl and the like.

TABLE III

| Example No. | R | R² |
|---|---|---|
| 28 | CH₃O—⟨naphthyl⟩— | —n-C₄H₉ |
| 29 | ⟨pyridyl-N⟩— | —n-C₆H₁₃ |
| 30 | ⟨pyridyl⟩— | —n-C₅H₁₁ |
| 31 | CH₃O—⟨OCH₃,OCH₃⟩— | —n-C₄H₉ |
| 32 | CH₃O—⟨OCH₃,OCH₃⟩— | —n-C₆H₁₃ |
| 33 | ⟨F,F,F,F,F⟩— | —n-C₄H₉ |
| 34 | ⟨naphthyl⟩— | —n-C₆H₁₁ |
| 35 | ⟨naphthyl-OCH₃⟩— | —n-C₄H₉ |
| 36 | CH₃O—⟨Cl,Cl⟩— | —n-C₄H₉ |

TABLE III—Continued

| Example No. | R | R² |
|---|---|---|
| 37 | 4-CH₃O, 3-Cl-phenyl 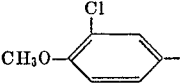 | —n-C₅H₁₁ |
| 38 | 4-HO-phenyl 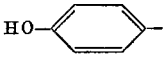 | —n-C₄H₉ |
| 39 | 4-HO, 3-CH₃O-phenyl 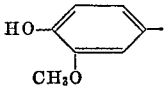 | —n-C₇H₁₅ |
| 40 | 4-CH₃CONH-phenyl  | 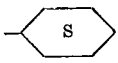 |

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range varying from 5 to 2,000 mg. The product is preferably administered in subdivided doses in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 50 milligrams of a 1-cyano-2-substituted ethenesulfonamide (I) or a suitable salt thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known diuretics and saluretics or with other desired therapeutic and/or nutritive agents in dosage unit form.

The following example is included to illustrate the preparation of a representative dosage form:

EXAMPLE 41

Dry-filled capsules containing 50 mg. of active ingredient per capsule.

| | Per capsule, mg. |
|---|---|
| 1-cyano-2-(2,3-dichloro-4-methoxyphenyl)ethenesulfonamide | 50 |
| Lactose | 149 |
| Magnesium stearate | 1 |
| Capsule (Size No. 1) | 200 |

The 1-cyano-2-(2,3-dichloro-4-methoxyphenyl)ethenesulfonamide is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the 1-cyano-2-substituted-ethenesulfonamides (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

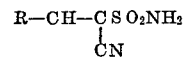

$$R-CH-C\ SO_2NH_2$$
$$\phantom{R-CH-}CN$$

wherein R is aryl which may be unsubstituted or substituted with from one to five substituents selected from hydrogen halogen, hydroxy, alkoxy, carboxy lower alkoxy, lower alkylenedioxy, alkyl, alkanoylamino or trihalo lower alkyl; and the non-toxic, pharmaceutically acceptable salts thereof.

2. A compound according to claim 1 of the formula:

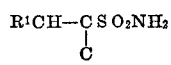

$$R^1CH-C\ SO_2NH_2$$
$$\phantom{R^1CH-}C$$

wherein R¹ is phenyl which is substituted with from one to three substituents selected from halo, hydroxy, lower alkoxy or lower alkanoylamino.

3. A compound according to claim 2 wherein R¹ is 2,3-dichloro-4-methoxyphenyl.

4. A compound according to claim 2 wherein R¹ is 3-chloro-4-methoxyphenyl.

5. A compound according to claim 2 wherein R¹ is 4-hydroxyphenyl.

6. A compound according to claim 2 wherein R¹ is 3-methoxy-4-hydroxyphenyl.

7. A compound according to claim 2 wherein R¹ is 4-acetylaminophenyl.

References Cited

Organic Reactions, vol. 15, pp. 204–212, John Wiley & Sons, Inc., New York (1967).

LEWIS GOTTS, Primary Examiner

D. H. TORRENCE, Assistant Examiner

U.S. Cl. X.R.

260—294.8, 326.62, 329 AM, 340.5, 347.2, 465 E; 424—263, 274, 275, 282, 285